United States Patent [19]

Frost

[11] 3,907,752

[45] Sept. 23, 1975

[54] AROMATIC NITRILE AMIDE POLYMERS

[75] Inventor: Lawrence W. Frost, Murrysville, Pa.

[73] Assignee: Westinghouse Electric Corporation, Pittsburgh, Pa.

[22] Filed: June 28, 1973

[21] Appl. No.: 374,597

[52] U.S. Cl.......... 260/47 CP; 117/161 P; 161/227; 260/78 TF; 260/78.4 N; 260/465 E
[51] Int. Cl.² .................. C08G 69/32; C08G 69/40
[58] Field of Search....... 260/78 TF, 47 CZ, 78.4 N, 260/47 CP, 49, 63 R, 65

[56] References Cited
UNITED STATES PATENTS 3,516,967  6/1970  Funer..................................  260/47
3,763,211  10/1973  Heath et al......................  260/465 E Primary Examiner—Lester L. Lee
Attorney, Agent, or Firm—R. D. Fuerle

[57] ABSTRACT

The present invention discloses a new class of linear polymers having the recurring units:

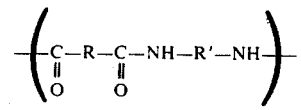

in which R and R' are divalent aromatic groups, at least one of which groups contains at least one or more nitrile groups as substituents. The linear nitrile amide polymers of the present invention preferably include a nitrile group attached to R' in a position ortho to the -NH- group and have the recurring units:

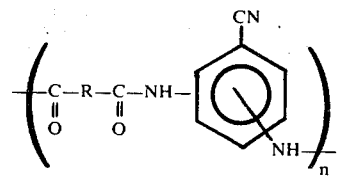

11 Claims, No Drawings

AROMATIC NITRILE AMIDE POLYMERS

BACKGROUND OF THE INVENTION

1. Field of the Invention

The present invention relates to linear aromatic nitrile amide polymers and, preferably nitrile amide polymers in which the nitrile group is ortho to the —NH— group. Related to this application is an application entitled "Composition of Cyanoimide Polymers and Heterocyclic Polymers Made from Cyanoimide Polymers," filed by Lawrence W. Frost on Oct. 30, 1970, Ser. No. 85,771, now U.S. Pat. No. 3,836,506.

2. Description of the Prior Art

Linear polymerized polyamides or copolymers thereof and methods for their preparation are generally well known. Linear polyamides have been used as photoconductors for electrostatic reproduction; U.S. Pat. No. 3,554,743. Compositions having halocarbon resins and polyamides uniformly dispersed through polyimide material have been used as bearing materials because of their wear resistance and good frictional properties; U.S. Pat. No. 3,356,760. Modified polyamide polymers such as polyamides using diaminobenzoanilides and diacid chlorides have provided high temperature resistant fibers, filaments, films and other shaped articles; U.S. Pat. No. 3,354,125. Other aromatic polyamides for use as fibers, filaments, supported films, coatings, varnishes, and the like, have been disclosed in U.S. Pat. Nos. 2,989,495, 3,624,033, and 3,575,934. The polyamides prepared in accordance with the latter patent include N-2-phenylbenzotriazole system as an essential constituent of the polymer chain and provide high melting points for those polymers.

SUMMARY OF THE INVENTION

The linear polymers of the present invention have the general formula:

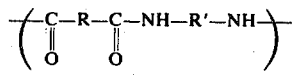

in which R and R' are divalent aromatic groups. At least one of R or R' contains one or more substituted nitrile groups. Preferably, R' contains a nitrile group ortho to the —NH— group as set forth in the following general formula:

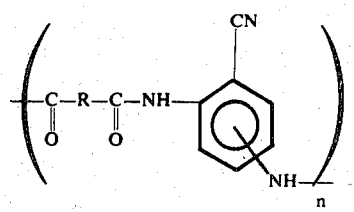

The polymers of the present invention are useful as intermediaries which can be converted, without volatile byproducts, to polymers containing highly stable aromatic heterocyclic structures. They are also useful without such a conversion, and the nitrile amide structure confers desirable properties for use as films, varnishes, wire enamels, laminating resins, adhesives, membranes for reverse osmosis, molding compounds, and the like.

A number of the polymers of the present invention have been found to have particular utility as free films. Such films are colorless, strong, and flexible. They are characterized by a higher dielectric constant than usually found in high temperature films. Accordingly, the present invention provides polymers unlike those of prior art polyamide polymers.

Generically, the polymers of the present invention are prepared by the reaction of one or more aromatic diacyl halides with one or more aromatic diamines in a suitable solvent. At least one of the acyl halides or aromatic diamines includes a nitrile group on the aromatic ring.

In the preferred embodiment of the invention, i.e., where the nitrile group is positioned ortho with respect to the —NH— group, the following ortho-cyanodiamines have been found suitable or are contemplated as being particularly well suited for the present invention: 2,4-diaminobenzonitrile, 2,5-diaminobenzonitrile, 3,3'-diamino-4,4'-dicyano-biphenyl, hydroquinone bis(p-amino-m-cyanophenyl) ether, N,N'-bis(4 amino-3-cyanophenyl-3,4,3',4'-benzophenonetetracarboxylic diimide, 3,3'-diamino-4,4'-dicyano diphenyl ether, N-(o-cyano-p-aminophenyl)-4-aminophthalimide and N,N-bis(p-amino-o-cyano-phenyl) pyromellitic diimide.

Aromatic diamines without a nitrile substituted group suitable for use in the present invention where R of the diacyl halide contains a nitrile group include: 1,3-diaminobenzene (MPD), 4,4'-diaminodiphenylmethane (MDA), 3,4'-diaminobenzanilide (MAB-PPD), 1,4-diaminobenzene, 4,4'-diaminodiphenyl sulfide, 2,2-bis(4-aminophenyl) propane, 1,4-diaminonaphthalene, 4,4'-diaminobiphenyl (benzidine) and 3,3'-dichloro-4,4' diaminodiphenyl. Other aromatic diamines contemplated to be suited are: 4,4'-diaminodiphenyl amine, 4,4'-diaminodiphenyl N-methyl amine, 4,4' diaminodiphenyl N-phenyl amine, 3,3'-diaminodiphenyl sulfone, 4,4'-diaminodiphenyl sulfone, 4,4'-diaminodiphenyl diethylsilane and 4,4'-diaminodiphenyl diphenylsilane. Preferably, however, the aromatic divalent diamines used in the preparation of the polymers of the present invention include a nitrile group as a substituent on the aromatic radical.

Diacyl halides suitable for use in the present invention have the structural formula:

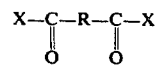

where R is a divalent aromatic radical, that is, it contains resonant unsaturation and X is a halogen atom from the class consisting of chlorine, bromine, and fluorine. The aromatic radical may have a single, multiple, or fused ring structure. One or more of the hydrogens of the aromatic nucleus may be replaced by nonpolyamide forming groups such as lower alkyl, lower alkoxy, lower carbalkoxy, and the like. Preferably, the aromatic radical contains a substituted nitrile group. Diacyl halides suitable for use in the present invention include: 1,3-benzene dicarboxylic dichloride (i.e., isophthaloyl chloride), 1,4-benzenedicarboxylic dichloride (i.e., terephthaloyl chloride), bibenzoyl-3,3'(or 4')-dicarboxylic dichloride, bibenzoyl-4,4'-dicarboxylic dichloride, 5-chloroisophthaloyl dichloride, 5- tertbutylisophthaloyl dichloride, 2,5-dichloroterephthaloyl dichloride, 2,6-naphthaloyl dichloride, bis(4-chlorocarbonylphenyl) ether, 1,10-bis(3-chlorocarbonylphenoxyl)-decane, p-phenylene bis (chloroformate), 2,2-bis(4-chlorocarbonyloxyphenyl)-propane, 1,1-bis(4-chlorocarbonyloxyphenyl)cyclohexane, and 2,2-bis(4-chlorocarbonyloxy-3,5-dichlorophenyl) propane.

The aromatic nitrile amide polymers of the present invention are prepared by reacting preferably equimolar portions of one or more aromatic diacyl halides and one or more aromatic diamines in a solvent such as dimethylacetamide. Other solvents, such as benzene, may also be present. While the reaction proceeds rapidly at moderate temperatures, it may be advantageous to heat the mixture to between 100° to 150°C to insure complete reaction. It is also preferable to remove hydrogen chloride produced as a byproduct by precipitating the polymer and washing it with water or by adding ethylene oxide or propylene oxide or the like to the polymer solution to convert the hydrogen chloride to an innocuous organic compound. Alternatively, the acid acceptor which removes the hydrogen chloride as an insoluble material may be present during the reaction or added later. Suitable acceptors are sodium carbonate and triethyl amine. In this case, the insoluble byproduct is removed from the polymer solution by filtration or centrifuging.

The polymers of the present invention may also be prepared by interfacial polycondensation. Generally, interfacial polycondensation includes mixing water, an emulsifier, and the diamine or its dihydrochloride. A proton acceptor is then added and the mixture is stirred rapidly. During this rapid stirring, the solution of the diacid chloride in an inert organic solvent is added. The mixture is stirred until polymerization is complete and the polymer is then isolated by filtration, washing and drying. The diacid chloride solvent may be an oxygenated organic solvent such as 2,4-dimethylcyclictetramethylene sulfone, tetrahydrofuran, propylene oxide, cyclohexanone, halogenated hydrocarbons, and hydrocarbons such as benzene, toluene, and xylene. Emulsification agents for interfacial polymerization include ionic and nonionic compounds such as sodium lauryl sulfate, phoxylphenoxy (ethyleneoxy) ethane, and sodium and potassium salts of any suitable condensed sulfonic acid or the like. Suitable proton acceptors include sodium and calcium carbonates and tertiary amines such as triethylamine, butylamine and the like.

Generally, the inherent viscosities of nitrile amide polymers of the present invention are greater than 0.1 dl/g and preferably lie within a range of 0.2 to 2.0 dl/g (0.5% in DMAC at 25°C).

Other advantages of the present invention will become apparent from a perusal of the following examples which constitute the presently preferred embodiments of the invention.

PRESENTLY PREFERRED EMBODIMENTS

Preparation of Nitrile Substituted Aromatic Diamines:

EXAMPLE 1

Preparation of 2,5-Diaminobenzonitrile

A mixture of 25 g 5-nitroanthranilonitrile (Aldrich Chemical Co.), 0.5 g 5% Pd.-on-C. catalyst, and 200 ml tetrahydrofuran (THF) was hydrogenated in a Parr shaker at 50 psi. and 90°C. Two such batches were combined and filtered. The filtrate was passed through a column of adsorption alumina, which was eluted with additional THF until 1500 ml of yellow effluent was obtained. The solution was evaporated to dryness in a stream of nitrogen, and the residue was further dried at 50°C in vacuum to give 33.9 g (83% yield) of 2,5-diaminobenzonitrile as a yellow powder, m.p. 87°–88°C. Recrystallization from benzene gave tan needles, m.p. 89°C.

Anal. Calc. for $C_7H_7N_3$: C, 63.19; H, 5.30; N, 31.56. Found: C, 63.59, 63.62; H, 5.34, 5,38; N, 31.08, 30.96.

EXAMPLE 2

Preparation of 2,4-Diaminobenzonitrile 2,4-dinitrobenzonitrile was prepared from 2,4-dinitrobenzoic acid and benzenesulfonamide by the method of Oxley, Partridge, Robson and Short, *J. Chem. Soc.*, 1946, 763. The product was purified by chromatography or alumina, using tetrahydrofuran as a solvent: yield, 56%; m.p. 102°C.

A solution of 74.6 g of stannous chloride dihydrate, 75 ml concentrated HCl, and 150 ml ethanol was cooled in an ice bath and stirred while adding 9.66 g (0.05 mole) of powdered 2,4-dinitrobenzonitrile at a rate that maintained a temperature of 25°–30°C. The resulting yellow solution was held at 40°C for 90 minutes while a stream of nitrogen was blown over the surface to evaporate most of the ethanol. The residue was a yellow slurry, which was cooled in an ice bath and stirred while a solution of 70 g NaOH in 280 g of water was added slowly. The mixture was then filtered. The filtrate was extracted 4 times with ethyl acetate and the extract evaporated to dryness. The residue was combined with the solids from the filtration, and the mixture was extracted with four 150 ml portions of boiling benzene. The benzene solution was evaporated to dryness to give 4.75 g of crude product, which was recrystallized from benzene to give 4.67 g (70% yield) of pure 2,4-diaminobenzonitrile, m.p. 105°C.

Anal. Calculated for $C_7H_7N_3$: C, 63.19; H, 5.30; N, 31.56. Found: C, 62.54, 62.67; H, 5.24, 5.09; N, 31.32, 31.10.

EXAMPLE 3

Preparation of 3,3'-Diamino-4,4' Dicyanobiphenyl

Sodium nitrite (3.0 g, .0435 mole) was added slowly to 30 ml of concentrated sulfuric acid, with stirring. The resulting solution was cooled to 25°C., and stirred while 5.48 g (.020 mole) of 3,3'-dinitrobenzidine was added slowly, with cooling to maintain a temperature of 20°–25°C. After an hour of stirring a viscous brown solution was obtained, to which was slowly added 30 ml of glacial acetic acid, using an ice bath to keep the temperature at 25°–30°C. The resulting solution was poured onto 200 g of crushed ice and a solution of 32 g (0.8 mole) of sodium hydroxide in 50 ml of water was added slowly with cooling (30°C). The resulting solution was added slowly to a stirred solution of 5.9 g (0.12 mole) of sodium cyanide, 4.48 g (0.05 mole) of cuprous cyanide, 32 g (0.8 mole) of sodium hydroxide and 160 ml of water. A mildly exothermic reaction occurred, with liberation of nitrogen and a final temperature of 38°C. The mixture was stirred at 40°–60°C for 30 minutes, let stand overnight at room temperature, and filtered. The solid product was washed with water and dried at 110°C under vacuum to give 4.6 g of black powder.

A 1.00 g sample of the black powder was extracted with three 20 ml portions of boiling xylene. The extracts yielded 0.36 g of yellow powder, which was further purified by column chromatography. In a typical run an 0.20 g sample of the yellow powder was dissolved in 15 ml of tetrahydrofuran and applied to a column of neutral alumina. Additional tetrahydrofuran was used to elute the column. A 20 ml middle fraction was evaporated to dryness to give 0.18 g of 3,3'-dinitro-4,4'-dicyanobiphenyl as a yellow powder, m.p. 246°C.

Anal. Calculated for $C_{14}H_6N_4O_4$: C, 57.15; H, 2.06; N, 19.04; O, 21.75. Found: C, 57.20, 57.35; H, 2.37, 2.36; N, 17.83, 17.92; O, 22.77, 22.59.

The infrared spectrum had strong adsorption bands at 2230 (nitrile), 1531 (nitro) and 1345 (nitro) $cm^{-1}$.

The 3,3'-diamino-4,4'-dicyanobiphenyl was prepared by dissolving 4,4'-dicyano-3,3'-dinitrobiphenyl (1.14 g, 0.0039 mole) in 200 ml of tetrahydrofuran and hydrogenating in a Parr shaker at 55 psi. and 70°C for 1 hour, using 0.5 of 5% Pd.-on-C. catalyst. The catalyst was filtered off, and the filtrate was evaporated to dryness to give 1.07 g of yellow powder. An 0.20 g sample of the product was dissolved in 10 ml of tetrahydrofuran and applied to a column of neutral alumina. The column was eluted with absolute ethanol to give a fraction which was evaporated to dryness and baked at 75°C in vacuum to give 0.08 g of 3,3'-diamino-4,4'-dicyanobiphenyl as a yellow powder, m.p. 243°C.

Anal. Calculated for $C_{14}H_{10}N_4$: C, 71.78; H, 4.31; N, 23.92. Found: C, 71.65, 71.48; H, 4.28, 4.38; N, 22.65, 22.60.

EXAMPLE 4

Preparation of N,N'-bis(4-Amino-3-Cyanophenyl)-3,4,3',4'-Benzophenonetetracarboxylic Diimide A solution of 2.66 g (0.02 mole) of 2,5-diaminobenzonitrile (Example 1) in 10 ml DMAC was stirred while slowly adding 3.22 g (0.01 mole) of 3,4,3',4'-benzophenonetetracarboxylic dianhydride. An exothermic reaction occurred, with formation of a clear brown solution, which was slowly heated to 150°C (1 hour). A brown precipitate formed. The mixture was cooled to room temperature and filtered. The solid product was washed with DMAC and dried at 160°C in vacuum to give 3.30 g (60% yield) of a tan powder, m.p. 388°C. A solution of this material in 50 ml of N-methylpyrrolidone wa passed through a column of adsorption alumina, which was eluted with additional N-methylpyrrolidone to give 200 ml of effluent. An equal volume of water was added to the solution, and the mixture was allowed to stand for 10 days. A fine precipitate formed slowly. Most of the supernatant liquid was decanted from the settled solid, which was washed with water, using a centrifuge for separation. The residue was dried at 120°C in vacuum to give 1.37 g of purified N,N'-bis(4-amino-3-cyanophenyl)-3,4,3'-4'-benzophenonetetracarboxylic diimide, m.p. 382°C.

EXAMPLE 5

Preparation of 3,3'-Diamino-4,4'-Dicyanodiphenyl Ether

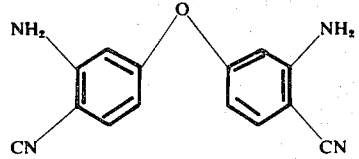

One hundred fifty ml of concentrated sulfuric acid was stirred while 15 g (0.22 mole) of sodium nitrite was added slowly. The mixture was then heated to 70°C for a few minutes until clear. The solution was cooled and held at 20°–30°C while adding 29 g (0.1 mole) of 3,3'd-initro-4,4'-oxydianiline. The resulting dark solution was stirred for 1 hour, after which 150 ml of glacial acetic acid was slowly, with stirring and cooling to keep the temperature at 25°–30°C. The resulting solution was poured onto 1000 g of crushed ice, with stirring. A solution of 160 g of sodium hydroxide in 250 ml of water was added with stirring. Ice was added as needed to keep the temperature below 30°C. The resulting clear brown solution was added with stirring to the following solution:

| | |
|---|---|
| sodium cyanide | 29.5 g (0.6 mole) |
| cuprous cyanide | 22.4 g (0.25 mole) |
| sodium hydroxide | 160 g (4 moles) |
| water | 800 ml | cooling as necessary to keep the temperature below 50°C. After the addition the mixture was held at 50°–60°C for 0.5 hour and allowed to stand overnight at room temperature. It was filtered, and the solid material washed with water and dried at 100°C in vacuum to give 41 g of dark red powder.

Three similar batches were combined and extracted four times with 2700 ml portions of boiling xylene. The combined extract was evaporated to dryness in a stream of nitrogen to give 29.5 g of solids. This material was dissolved in 1600 ml of warm tetrahydrofuran. The solution was poured through a column of adsorption alumina, which was eluted with additional tetrahydrofuran. Successive fractions were collected and evaporated to dryness separately in a stream of nitrogen. Residues with similar melting points were combined to give 18.9 g of 3,3'-dinitro-4,4' dicyanodiphenyl ether, m.p. 202°–204°C, which was dissolved in 189 ml of N,N-dimethylacetamide, and 0.1 g of 10% Pd.-on-C. catalyst was added. The mixture was hydrogenated in a Parr shaker at 90°C and 50 psi. The catalyst was filtered off and the filtrate poured into excess water. After standing several days in a refrigerator, the mixture was filtered. The solid product was washed with water and dried at 100°C in a vacuum to give 6.48 g of 3,3'-diamino-4,4'-dicyanodiphenyl ether, m.p. 156°C.

Anal. Calculated for $C_{14}H_{10}N_4O$: C, 67.19; H, 4.03; N, 22.39; O, 6.40. Found: C, 67.23, 67.03; H, 4.01, 4.14; N, 22.38, 22.40; O, 6.55, 6.45.

EXAMPLE 6

Preparation of Hydroquinone bis(4-Amino-3-Cyanophenyl) Ether

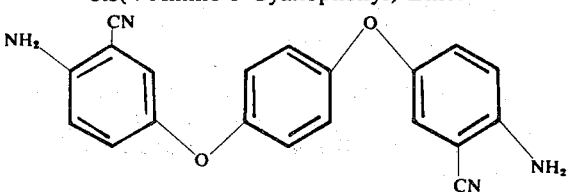

A solution of 5.51 g (.05 mole) of 1,4 benzenediol in 100 ml of water was stirred under nitrogen while a solution of 6.47 g (0.10 mole) of potassium hydroxide (86.5%) in 20 ml of water was added, followed by 200 ml of toluene. The mixture was refluxed with stirring, using a Dean-Stark trap, until the water was largely removed. Dimethylacetamide (200 ml) was then added, and solvent was distilled off until the pot temperature reached 150°C. The mixture was cooled to 50°C, and a solution of 18.26 g (0.10 mole) of 5-chloro-2-nitrobenzonitrile (Aldrich Chemical Co.) in 50 ml of dimethylacetamide was added with stirring. The mixture was stirred for 90 minutes at room temperature, 2 hrs. at 125°C, and 1 hr. at 155°C. After cooling to room temperature it was filtered. The filtrate was evaporated to dryness and the residue washed with 250 ml of tetrahydrofuran. The residual solid was dried in vacuum at 100°C to give 11.64 g (58% yield) of hydroquinone bis (4-nitro-3-cyanophenyl) ether, m.p. 233°C.

Anal. Calculated for $C_{20}H_{10}N_4O_6$: C, 59.71; H, 2.51; N, 13.92; O, 23.86. Found: C, 59.27, 59.42; H, 2.85, 2.75; N, 13.81, 13.60; O, 24.18, 23.92.

An additional 1.48 g (7.4% yield) of product was recovered from the tetrahydrofuran washings.

Reduction of this compound to hydroquinone bis (4-amino-3-cyanophenyl) ether can be accomplished with stannous chloride, using a procedure similar to that of Example 2.

EXAMPLE 7

Preparation of N-(2'-Cyano-4'-Amino Phenyl)-4-Aminophthalimide

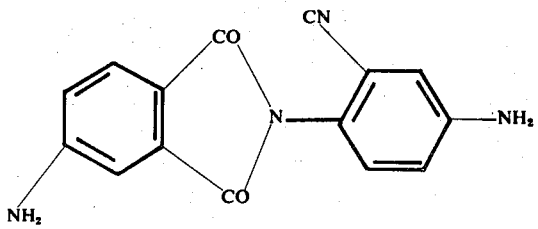

Equimolar quantities of 4-nitrophthalic anhydride and 5-nitroanthranilonitrile (Aldrich Chemical Co.) can be heated in a solvent such as dimethylformamide, dimethylacetamide or dimethyl sulfoxide to give N-(2'-cyano-4'-nitrophenyl)-4-nitrophthalimide, which can be isolated and purified by recrystallization. An alternative method of synthesis for this intermediate is the reaction of 2-chloro-5-nitrobenzonitrile with the potassium salt of 4-nitrophthalimide, using one of the solvents listed above.

Reduction of N-(2'-cyano-4'-nitrophenyl)-4-nitrophthalimide to N-(2'-cyano-4'-aminophenyl)-4-aminophthalimide can be done with stannous chloride, using a procedure similar to that of Example 2, or by catalytic hydrogenation over a palladium, platinum, or nickel catalyst.

EXAMPLE 8

Preparation of N,N'-bis(4-Amino-2-Cyanophenyl) Diimides

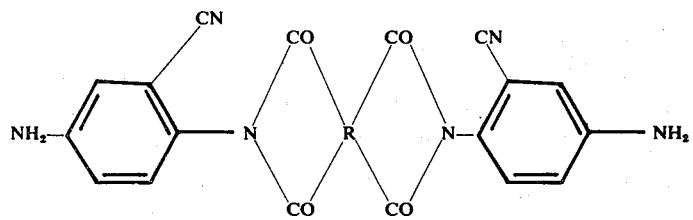

R in the above equation represents a tetravalent organic radical in which the free bonds are arranged in two pairs of adjacent bonds. Examples are 1,2,4,5- or 1,2,3,4-tetrasubstituted benzene; 1,2,3,4-tetrasubstituted cyclopentane; 2,3,4,5-tetrasubstituted tetrahydrofurane; or 3,3',4,4'-tetrasubstituted benzophenone.

The synthesis of these compounds is carried out by essentially the same procedure as Example 7, using two moles of 5-nitroanthranilonitrile and one mole of a dianhydride. Suitable dianhydrides are listed in column 6 of U.S. Pat. No. 3,179,632.

Preparation of Nitrile Amide Polymers:

EXAMPLE 9

Preparation of Polymer from 2,5-Diaminobenzonitrile and Isophthaloyl Chloride

A solution of 13.316 g (0.1 mole) of 2,5-diaminobenzonitrile (Example 1) in 150 ml of DMAC was stirred while adding 20.303 g (0.1 mole) of isophthaloyl chloride. The mixture became warm and formed a clear viscous solution, which was held at 60°–70°C for 1 hour to complete the reaction. The resulting solution was cooled to room temperature, diluted with 50 ml of DMAC, and divided into three equal parts. Each portion was poured slowly into 500 ml of rapidly stirred water. The three batches of precipitated polymer were combined and filtered. The solid product was washed with water, dried at 100°C in vacuum, redissolved in 300 g of DMAC, precipitated in water, washed with water, and dried at 120°C in vacuum to give 23 g (87% yield) of solid polymer as a fluffy white powder. This powder was dissolved in 130 g of DMAC to give a 15% polymer solution having a viscosity of Z-3 (Gardner). Inherent viscosity (0.5% in DMAC, 25°C) was 0.78 dl/g.

EXAMPLE 10

Preparation of Polymer from 2,4-Diaminobenzonitrile and Terephthaloyl Chloride

A mixture of 1.3316 g (0.01 mole) of 2,4-diaminobenzonitrile (Example 2), 2.0303 g (0.01 mole) of tetephthaloyl chloride, and 9 ml of DMAC was stirred. An exothermic reaction occurred, with formation of a very viscous pale yellow solution, which was diluted with an additional 23 g of DMAC. The solution was held at 100°C for 30 minutes, cooled to room temperature, and poured into an excess of rapidly stirred water. The precipitated polymer was filtered off, dissolved in 100 ml of DMAC, precipitated a second time in water, filtered off, washed with water, and dried at 130°C in vacuum to give 2.58 g (98% yield) of polymer as a white powder. Inherent viscosity (0.5% in DMAC, 25°C) of the polymer was 0.87 dl/g. A clear, colorless 2 mil film was cast from a 20% solution of the polymer in DMAC by baking for 18 hours at 150°C and 2 hours at 200°C. It was stripped from the substrate and creased in alternate directions more than 15 times before craking.

A larger batch of the same polymer was prepared similarly from 9.0073 g (0.0677 mole) of a less pure grade of 2,4-diaminobenzonitrile, 13.7335 g (0.0677 mole) of terephthaloyl chloride, and 110 ml of DMAC. After precipitation, washing and drying, the polymer was a cream-white powder weighing 15.31 g (86% yield). It was dissolved in DMAC to make a 15% solution, viscosity S (Gardner). Films for electrical and mechanical tests were cast from this solution.

EXAMPLE 11

Preparation of Polymer from 2,5-Diaminobenzonitrile, Isophthaloyl Chloride, and Terephthaloyl Chloride A solution of 13.316 g (0.1 mole) of 2,5-diaminobenzonitrile (Example 1) in 150 ml DMAC was stirred while adding 12.2273 g (0.0602 mole) of isophthaloyl chloride, followed by 5.0758 g (0.025 mole) of terephthaloyl chloride, and then an additional 3.0000 g (0.0148 mole) of isophthaloyl chloride. The mixture became warm and a viscous solution was obtained. An ice bath as used to keep the temperature below 60°C during the addition. When solution was complete, heat was applied, and a temperature of 60°–70°C was maintained for 1 hour. The solution was cooled to room temperature, diluted with 150 ml DMAC, and poured slowly into about 4 l. of rapidly stirred water. The precipitated polymer was filtered off, washed with water, dried, redissolved in 300 g DMAC, reprecipitated in water, filtered off, washed with water, and dried at 150°C in vacuum to give 25 g (95% yield) of polymer as a dry fluffy white solid. A 15% solution of this polymer in DMAC had a viscosity of Z-2 to Z-3 (Gardner).

EXAMPLE 12

Polymer from 2,4-Diaminobenzonitrile and Isophthaloyl Chloride

A solution of 1.3316 g (0.01 mole) of 2,4-diaminobenzonitrile (Example 2) in 17 ml DMAC was stirred while adding 2.0303 g (0.01 mole) of isophthaloyl chloride. It dissolved rapidly and exothermically to give a clear yellow solution, which was allowed to stand for 1 hour and then was poured into stirred water. The precipitated polymer was filtered off, redissolved in 30 ml DMAC, precipitated again in water, washed with water, and dried at 160°C in vacuum to give 2.43 g (93% yield) of polymer as a white powder. Inherent viscosity (0.5% in DMAC, 25°C) was 0.24 dl/g. Films cast from a 20% DMAC solution were clear, colorless, and continuous, but cracked when creased.

EXAMPLE 13

Polymer from 2,5-Diaminobenzonitrile and Terephthaloyl Chloride

A solution of 1.3316 g (0.01 mole) of 2,5-diaminobenzonitrile (Example 1) in 12 ml DMAC was stirred while adding 2.0303 g (0.01 mole) of terephthaloyl chloride. An exothermic reaction occurred, with the formation of a very viscous, gelatinous mass. An additional 50 ml of DMAC was added, and the mixture was held at 100°C for 2 hours. A dry gel was obtained, which was broken up and stirred vigorously in water. The solid product was filtered off, washed with water, and dried at 110°C in vacuum to give 2.56 g (97% yield) of polymer as a gray-white powder. This polymer was insoluble in DMAC and similar solvents, even at 150°C. It dissolved in conc. sulfuric acid.

EXAMPLE 14

Polymer from 3,3'-Diamino-4,4'-Dicyanodiphenyl Ether and Isophthaloyl Chloride

A solution of 0.2503 g (0.001 mole) of 3,3'-diamino-4,4'-dicyanodiphenyl ether (Example 5) in 1.52 g DMAC was stirred while adding 0.2030 g (0.001 mole) of isophthaloyl chloride. It dissolved with a slight exotherm to give a solution of low viscosity, which was boiled gently for 2 hours and then cooled to give a viscous orange solution. This solution was diluted with DMAC and poured into water. The precipitated polymer was filtered off, redissolved in DMAC, reprecipitated in water, and dried at 120°C in vacuum to give 0.24 g (63% yield) of polymer as a yellow powder. This powder was dissolved in 0.72 g of DMAC to give a 25% solution from which a film was cast by baking at 150°C. The film was clear yellow, continuous, but rather brittle.

EXAMPLE 15

Polymer from 3,3'-Diamino-4,4'-Dicyanodiphenyl Ether and Terephthaloyl Chloride

The procedure of Example 14 was repeated, substituting an equal quantity of terephthaloyl chloride for the isophthaloyl chloride. The product was a yellow powder weighing 0.30 g (79% yield), which was dissolved in 0.70 g of DMAC. A film cast from this solution by baking at 150°C was clear yellow, continuous, rather brittle.

EXAMPLE 16

Polymer from N,N'-bis(4-Amino-3-Cyanophenyl)-3,4,3',4'-Benzophenonetetracarboxylic Diimide and Terephthaloyl Chloride A mixture of 0.5525 g (0.001 mole) of the product of Example 4, 0.2030 g (0.001 mole) of terephthaloyl chloride, 2.05 g of DMAC, and 3 ml of N-methylpyrrolidone was stirred and boiled gently for 5 minutes. A clear brown solution was obtained, which was cooled to room temperature and poured into water. The precipitated polymer was filtered off, washed with water, and dried at 120°C in vacuum to give 0.64 g (94% yield) of polymer as a brown powder. This polymer contains amide, imide, and nitrile groups.

Film Casting and Test Results:

Wet films 6 × 12 × 0.006 inch were laid down on plate glass, using a Bird film applicator. The coated plates were then baked for various times at successively higher temperatures, as shown in Table I. The polymeric films were then peeled from the glass, using water if necessary as a release agent.

Table I summarizes test results obtained for these films:

While present embodiments have been described in particularity, the invention may otherwise be embodied within the scope of the appended claims.

What is claimed is:

1. A nitrile amide polymer having the recurring structural unit

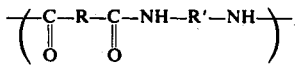

TABLE I

| Polymer, Example Number | Cure Schedule | | Tensile Properties | | MIT Fold Endurance, Cycles | Dielectric Constant, $\epsilon'$ | | | Dissipation Factor, tan δ | | | Dielectric Strength (60 Hz), KV/mil |
|---|---|---|---|---|---|---|---|---|---|---|---|---|
| | Min. | °C | Strength, psi | Elongation at Break, % | | 60 Hz | 1 KHz | 10 KHz | 60 Hz | 1 KHz | 10 KHz | |
| 9 | 15 | 100 | | | | | | | | | | |
|   | 30 | 150 | | | | | | | | | | |
|   | 120 | 200 | 16,900 | 6.5 | 30,000 | 7.2 | 6.8 | 6.2 | 0.037 | 0.035 | 0.017 | 3.8 |
| 9 | 15 | 100 | | | | | | | | | | |
|   | 30 | 150 | | | | | | | | | | |
|   | 120 | 200 | | | | | | | | | | |
|   | 30 | 250 | 16,000 | 3.5 | 22,000 | — | — | — | — | — | — | — |
| 9 | 60 | 150 | | | | | | | | | | |
|   | 60 | 200 | 16,100 | 6.3 | — | 7.0 | 6.6 | 6.0 | 0.036 | 0.034 | 0.045 | 4.4 |
| 10 | 15 | 100 | | | | | | | | | | |
|    | 30 | 150 | | | | | | | | | | |
|    | 120 | 200 | — | — | 5,000* | 8.1 | 7.6 | 6.9 | 0.034 | 0.033 | 0.029 | 3.5 |
| 11 | 15 | 100 | | | | | | | | | | |
|    | 30 | 150 | | | | | | | | | | |
|    | 120 | 200 | | | | | | | | | | |
|    | 30 | 250 | 21,200 | 3.2 | 26,000 | — | — | — | — | — | — | — |

*Low MW sample. Higher values obtainable with a better sample.

With respect to the formation of good films, it should be noted that when R is m- or p-phenylene and R' is a nitrile-substituted m- or p-phenylene, good films are obtained only when both the m- and p- structures are present. For example, the meta polymer of Example 12 was of low molecular weight and poor flexibility and the all para polymer of Example 13 was so insoluble that films could not be cast.

From Table I, it is clear that the nitrile amide polymers of the present invention have particular utility as free films. These films were colorless, strong and flexible and characterized by their high dielectric constant.

The nitrile amide polymers can also be converted upon heating without volatile byproducts and with or without catalysts to polymers containing highly stable aromatic heterocyclic structures:

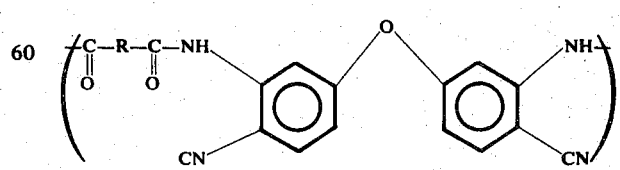

where R and R' are divalent aromatic groups and where at least R' contains at least one nitrile group as a substituent, at least one nitrile group in R' being ortho to an amide group.

2. A nitrile amide polymer as set forth in claim 1 having an inherent viscosity greater than 0.1 dl/g (0.5% in DMAC at 25°C).

3. A nitrile amide polymer as set forth in claim 1 having an inherent viscosity from 0.2 to about 2.0 dl/g (0.5% in DMAC at 25°C).

4. A nitrile amide polymer having the recurring structural unit

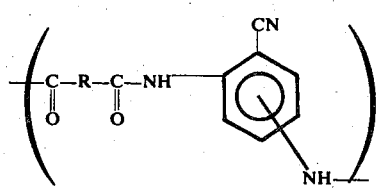

where R is a divalent aromatic group.

5. A nitrile amide polymer as set forth in claim 4 wherein R contains one or more nitrile groups as substituents.

6. A nitrile amide polymer having the recurring structural unit where R is a divalent aromatic group.

7. A nitrile amide polymer having the of recurring structural units having the formula

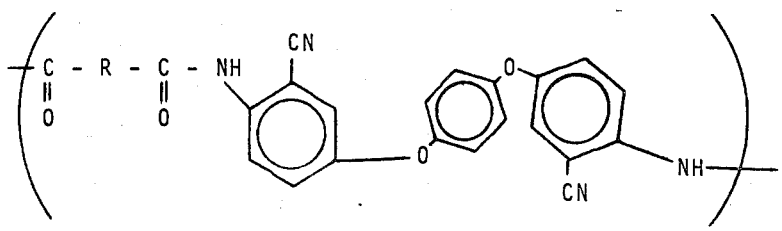

where R is a divalent aromatic group.

8. A method for the preparation of a nitrile amide polymer having the repeating unit

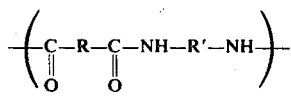

where R and R' are divalent aromatic groups and where at least R' contains at least one nitrile group as a substituent, at least one nitrile group in R' being ortho to an amide group, comprising A. reacting in an effective solvent essentially equimolar portions of
  1. at least one aromatic diacyl halide with
  2. at least one aromatic diamine having at least one nitrile group ortho to at least one of the amine groups, and
B. removing any hydrogen halides formed.

9. A nitrile amide polymer as set forth in claim 1 wherein R is selected from the group consisting of m-phenylene, p-phenylene, and mixtures thereof.

10. A nitrile amide polymer as set forth in claim 4 wherein R is selected from the groups consisting of m-phenylene, p-phenylene, and mixtures thereof and wherein both said R group and the amide aromatic group are not all m-phenylene nor all p-phenylene.

11. A method as set forth in claim 8 wherein said nitrile amide polymer is prepared by interfacial polycondensation in an emulsion.

* * * * *